United States Patent
Inaba

[11] Patent Number: 4,475,160
[45] Date of Patent: Oct. 2, 1984

[54] METHOD OF SENSING ABNORMAL CONDITION IN ROBOT CONTROL APPARATUS

[75] Inventor: Hajimu Inaba, Hino, Japan

[73] Assignee: Fanuc Ltd., Tokyo, Japan

[21] Appl. No.: 334,926

[22] Filed: Dec. 28, 1981

[30] Foreign Application Priority Data

Dec. 30, 1980 [JP] Japan .................................. 55-186751

[51] Int. Cl.³ ............................................ G06F 15/46
[52] U.S. Cl. ................................... 364/513; 364/192; 364/474; 318/568
[58] Field of Search ............... 364/474, 475, 513, 191, 364/192, 193; 318/568, 632; 414/5, 730

[56] References Cited

U.S. PATENT DOCUMENTS

| | | | |
|---|---|---|---|
| 4,150,326 | 4/1979 | Engelberger et al. | 318/568 |
| 4,258,425 | 3/1981 | Ramsey et al. | 364/513 |
| 4,356,554 | 10/1982 | Susnjaia et al. | 364/513 |
| 4,370,721 | 1/1983 | Berenberg et al. | 364/474 |
| 4,386,305 | 5/1983 | Kohzai et al. | 364/474 |
| 4,386,408 | 5/1983 | Imazeki et al. | 364/474 |

FOREIGN PATENT DOCUMENTS 1204148 11/1967 United Kingdom .
1336411 1/1972 United Kingdom .
1548657 4/1976 United Kingdom .

*Primary Examiner*—Jerry Smith
*Assistant Examiner*—John R. Lastova
*Attorney, Agent, or Firm*—Staas & Halsey

[57] ABSTRACT

Disclosed is a method of sensing an overload abnormality in a robot control apparatus for controlling a robot on the basis of instructive data. A motor for driving the robot has the upper and lower limits of its drive current or of its driving power set in advance. Then, when the robot is operating in the playback mode, the value of the drive current or power is monitored, and an operation is performed to check whether the value of the motor drive current or power is within the range of the set limit values, enabling an overload abnormality to be sensed. In accordance with the inventive method an instruction for checking the motor drive current or power is inserted beforehand at a proper location in the instructive data. When said instruction is read, a discrimination operation is performed to determine whether the drive current or power is within the range of the limit values.

9 Claims, 5 Drawing Figures

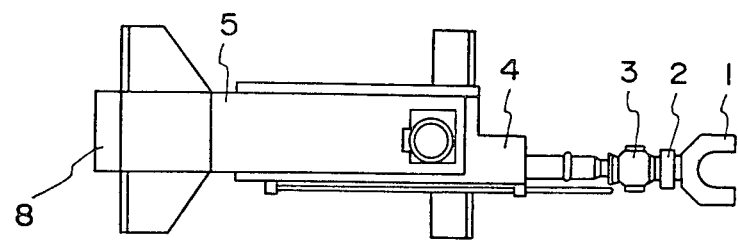
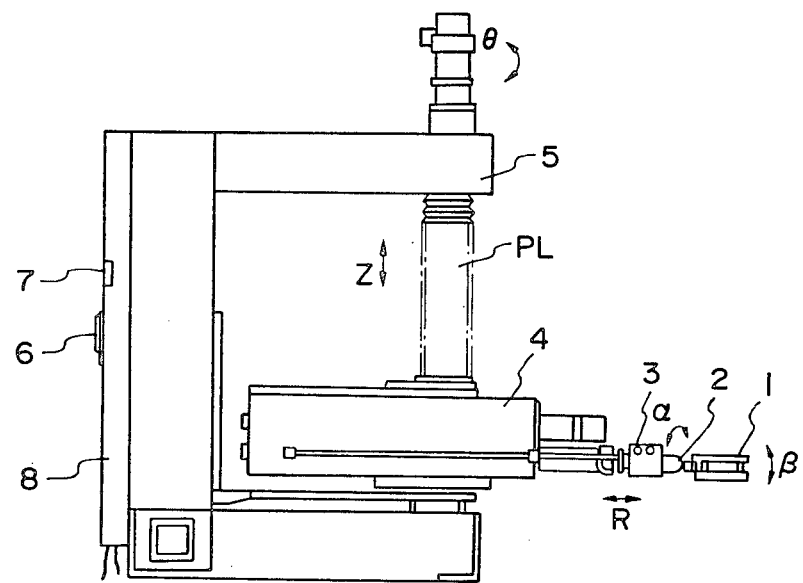

METHOD OF SENSING ABNORMAL CONDITION IN ROBOT CONTROL APPARATUS

BACKGROUND OF THE INVENTION

This invention relates to a method of sensing an abnormal condition in a robot control apparatus and, more particularly, to a method for assuring safe operation upon sensing an abnormal condition such as an overload acting upon a robot.

The rising cost of labor in the industrialized world has given rise to a demand for labor-saving measures and for improvements in work procedures. Industrial robots have been put into use to meet this demand and have been very successful in doing so. Particularly outstanding results have been achieved in plants having numerous machine tools where industrial robots are used to perform such simple tasks as changing the workpieces and tools associated with each machine tool. The demand for such robots has grown yearly. These industrial robots have a so-called "lay-back" capability, in which the robots are taught their tasks or services and then caused to perform these tasks as necessary. Specifically, a teaching box is used to enter the tasks that are to be performed, these tasks constituting robot instruction data which is stored beforehand in a memory located within the associated control unit. Whenever a request for a particular service arrives from the machine tool, a series of the above robot instruction data is read out of the memory sequentially, and the robot responds to the instructions by servicing the machine tool as required.

The robot instruction data comprises positional information regarding the point at which a service is to be performed, robot operating speed, and service codes which instruct how the robot hand is to be controlled at the abovementioned point and which instruct also the exchange of signals with the machine tool side. In general, the teaching operation mentioned above proceeds in the following order: (1) establish the memory addresses of the locations at which the items of robot instruction data are to be stored; (2) position the robot arm by a jog feed operation (that is, by moving the arm manually); (3) set the positional information regarding the servicing point and set the value of the speed command; and (4) set the robot service codes. A series of robot operations related to a machine tool is taught by repeating the aforesaid steps (1) through (4). Accordingly, as long as there are no problems with the mechanism or control system of the robot, and after the robot arm has been positioned at the predetermined operating speed, the robot will respond to the instruction data to execute such services as workpiece and/or tool exchange, cleaning of machining scraps, manipulation of the robot hand and the like.

There are cases, however, where the robot may malfunction or where an abnormal condition may develop in the associated peripheral equipment. When such is the case the robot may grasp an extremely heavy workpiece, the hand of the robot may close upon itself with the intent to grasp a workpiece, or the robot may attempt to lift a workpiece together with the associated jig. It may even press against the machine tool. The occurrence of such overload malfunctions can result in damage to the robot or machine tool or both. The conventional systems have not been designed to deal adequately with the foregoing problems and therefore do not assure a suitable degree of safety.

BRIEF SUMMARY OF THE INVENTION

Accordingly, an object of the present invention is to provide a novel method of robot control which enables overload malfunctions to be detected.

Another object of the present invention is to provide a method of sensing abnormal conditions in a robot control apparatus, enabling damage to a machine tool and to the robot to be prevented by halting the operation of the robot immediately after sensing an overload.

Still another object of the present invention is to provide a method of sensing abnormal conditions in a robot control apparatus, enabling abnormal robot operation to be sensed by teaching, in advance, the magnitude of a motor drive current, or the limit values of the motor drive current, which prevail when the robot is operating normally, and then comparing the magnitude of the motor drive current when the robot is actually performing a task with the value of the taught drive current or with the limit values.

A further object of the present invention is to provide a method of sensing abnormal conditions in a robot control apparatus, enabling an overloaded condition to be checked for at a predetermined robot position in a simple manner by inserting a drive current check instruction as an item of the robot instruction data in the correct place within the instructive data.

These and other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 shows an example of an industrial robot to which the present invention can be applied, in which (A) is a plan view and (B) is a side view.

DESCRIPTION OF THE PREFERRED EMBODIMENTS

Figure 2:
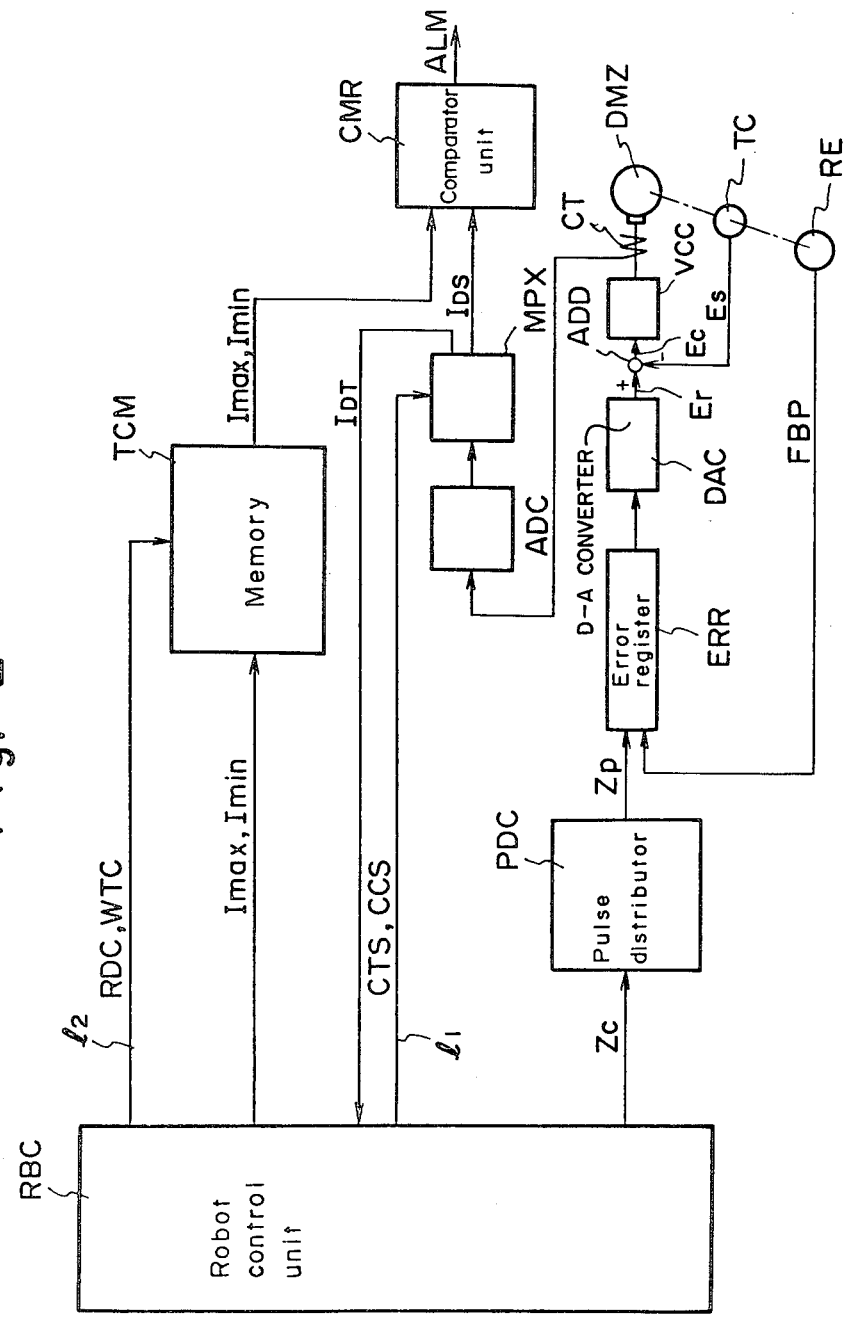
FIGS. 2, 3 and 4 are block diagrams of different arrangements for practicing the inventive method of sensing abnormal conditions in a robot control apparatus.

Before beginning the description of the present invention, an industrial robot to which the present invention may be applied will be discussed with reference to FIG. 1. The industrial robot comprises a mechanical hand 1 for gripping workpieces or tools that are to be exchanged, a wrist 2 capable of being twisted about the $\alpha$-axis and inclined up and down about the $\beta$-axis, an arm 3 which can be freely extended and retracted along the R-axis, a casing 4 which can be moved vertically along the Z-axis along a shaft PL and swiveled from side to side about the $\theta$-axis on the shaft PL, a frame 5 for supporting the casing, a teaching box 6 for teaching robot motion, a control panel 7 manipulated by the operator, and a control unit 8 for storing, in succession, the data taught using the teaching box (which data will be referred to as instructive data hereinafter), such as the operation position (the point at which a particular service is to be performed), the operating speed and the various services to be performed, and for controlling the motion of the hand 1, wrist 2 and casing 4 in accordance with the instructive data.

Reference will now be had to FIG. 2 to describe the present invention in detail. A robot control unit RBC, composed of a microcomputer, is adapted to store instructive data, a control program and other such data and to exchange signals with the machine tool in order to effect control of the robot. A pulse distributing circuit PDC receives a Z-axis movement command $Z_c$ from the robot control unit RBC and performs a pulse distributing operation on the basis of the magnitude of $Z_c$ to produce distributed pulses (referred to as command pulses hereinafter) $Z_p$, the number $Z_p$ pulses is a function of the magnitude of $Z_c$. The command pulses $Z_p$ are applied to a reversible counter (referred to as an error register hereinafter) ERR which also receives feedback pulses FBP each of which is generated whenever a DC motor DMZ, to be described later, rotates through a predetermined angle. The error register ERR is adapted to count up or to count down, in accordance with the direction of robot movement, the command pulses $Z_p$ and the feedback pulses FBP. More specifically, assume that the robot is travelling along the Z-axis in the positive direction. In such case the content of error register ERR will be up-counted by one count each time a command pulse $Z_p$ is generated, and will be down-counted by one count each time a feedback pulse FBP is generated. Conversely, when the robot is travelling along the Z-axis in the negative direction, the content of error register ERR will be down-counted by one count each time a command pulse $Z_p$ is produced, and will be up-counted by one count each time a feedback pulse FBP is produced. The information stored in the error register ERR always represents the difference between the number of command pulses $Z_p$ and the number of feedback pulses FBP. A digital-to-analog (DA) converter DAC receives from the error register ERR a signal indicative of its contents and executes a DA conversion to produce an analog positional error voltage $E_r$ which is proportional to the received signal, that is, to the content of the error register ERR. An adding/subtracting circuit ADD produces a differential voltage $E_c$ by computing the difference between the positional error voltage $E_r$ and an actual speed voltage $E_s$ which is proportional to the actual speed of the DC motor DMZ. A speed control circuit VCC, which receives the voltage differential $E_c$ from the adding/subtracting circuit ADD, includes such circuitry (not shown) as a phase compensating circuit, a thyristor phase control circuit and a thyristor circuit, and is adapted to control the motor speed in such a manner that the voltage differential $E_c$ approaches zero. Specifically, the thyristor phase control circuit advances or retards the thyristor firing phase in accordance with the magnitude of the voltage differential $E_c$, thereby regulating the voltage applied to the motor to control the rotational speed of the motor. The motor DMZ referred to above is a DC motor for drive along the Z-axis and receives the regulated voltage from the speed control circuit VCC. A tacho-generator TC is coupled directly to the DC motor shaft and produces the actual speed voltage $E_s$ whose amplitude is proportional to the actual rotational speed of the DC motor DMZ. A sensor RE, such as a rotary encoder or resolver, generates one feedback pulse FBP each time the DC motor DMZ rotates by a predetermined angle. A current sensor CT, such as a current transformer, senses the armature current (referred to as the drive current hereafter) which flows into the DC motor DMZ. An AD converter ADC receives the drive current detected by the current sensor CT and converts it into a digital value.

MPX denotes a multiplexer which receives the digital value from the AD converter ADC. When the robot control unit RBC delivers a current teach signal CTS in a current teach mode of operation, the multiplexer MPX transmits the digital value $I_{DT}$ of the drive current at that time to the robot control unit RBC. When the robot control unit RBC sends a current check command CCS to the multiplexer MPX while the robot is actually performing a service, the multiplexer MPX responds by applying the digital value $I_{DS}$ of the actual drive current which prevails during the performance of the robot service, to a comparator unit CMR which will be described below. Upon receiving the digital drive current value $I_{DT}$ from the multiplexer MPX, the robot control unit RBC processes the signal in a predetermined manner to compute the limit values of the drive current at the time of an abnormal condition, namely the upper and lower limits of the drive current. The robot control unit RBC stores these upper and lower limits in a memory TCM. More specifically, the memory TCM stores the upper and lower limits $I_{max}$, $I_{min}$ of the allowable current. These upper and lower limit values are written into predetermined addresses of the memory TCM by a write command WTC, and are read out from the predetermined addresses of the memory TCM by a read command RDC. These commands RDC, WTC are issued by the robot control unit RBC. When the robot control unit RBC issues the current check signal CCS during the performance of a robot service, the comparator CMR mentioned above compares the upper and lower limit values $I_{max}$, $I_{min}$, delivered by the memory TCM, with the value $I_{DS}$ of the drive current, delivered by the multiplexer MPX, that prevails during the performance of the robot service. When the magnitude of the drive current $I_{DS}$ is found to be greater than $I_{max}$ or less than $I_{min}$, the comparator CMR generates an alarm signal ALM.

The operation of the apparatus shown in FIG. 2 will now be described. First, the robot control unit RBC is taught the required robot motions and operations in the ordinary manner. During this procedure a drive current check instruction is entered in advance by the operator at the proper place in the instructive data. This is performed by entering a robot service code which imposes the drive current check instruction on the instructive data at the location where the drive current is desired to be checked. Next, the apparatus is placed in the current teaching mode and the robot is actuated in accordance with the instructive data.

When the robot control unit RBC issues the Z-axis movement command $Z_c$, the pulse distributing circuit PDC performs a pulse distributing operation and delivers the command pulses $Z_p$ in the manner described above. The error register ERR counts the command pulses $Z_p$ up or down in accordance with the direction of robot movement, sending the resulting value to the DA converter DAC which converts this signal into the positional error voltage $E_r$. The positional error voltage $E_r$ is applied to the DC motor DMZ through the adding/subtracting circuit ADD and speed control circuit VCC, thus driving the motor DMZ into rotation. As the motor DMZ rotates, the tachogenerator TC produces the actual speed voltage $E_s$, and the sensor RE generates one feedback pulse FBP each time the DC motor DMZ rotates by a predetermined angle. The feedback pulses enter the error register ERR which now delivers the arithmetic difference between the distributed command pulses $Z_p$ and the feedback pulses FBP. The difference, namely the content of the error register ERR, is converted into the positional error voltage $E_r$ in the manner described above. Next, the adding/subtracting circuit ADD computes the voltage differential $E_c$, namely the deviation from the actual speed voltage $E_s$. The motor DMZ is rotated by the differential voltage, so that the robot is transported toward the target position along the Z-axis at the commanded speed. In other words, the robot, in accordance with the instructive data, is moved toward the new target position and executes the predetermined task.

When the drive current check instruction is read from the instructive data under the foregoing conditions, the robot control unit first issues the current teach signal CTS, in response to which it receives the digital drive current value $I_{DT}$ through the multiplexer MPX. The robot control unit RBC then subjects this digital, value $I_{DT}$ to predetermined processing to find the upper and lower limits $I_{max}$, $I_{min}$ of the allowable current. These limit values are then stored in the memory TCM. The robot control unit can be arranged to compute these values in the following manner. When the current teach signal CTS has been generated, the robot control unit can receive the drive current at predetermined time intervals when the robot has moved from one point to the next, and to compute the upper and lower limits based on the average value of the deviation received each time, or based on the maximum value and minimum value of the current.

Thereafter the robot operations are executed in accordance with the instructive data and the upper and lower limits of the drive current at other robot positions are taught concurrently.

When the drive current check instruction is read from the instructive data during the performance of a robot service in which the robot is being controlled in accordance with the instructive data, the robot control unit RBC delivers the current check signal CCS and the read command RDC on lines $l_1$, $l_2$, respectively. As a result, the predetermined upper and lower limit values $I_{max}$, $I_{min}$ are delivered by the memory TCM, and the digital drive current values $I_{DS}$ is delivered at predetermined times by the multiplexer MPX, the values of $I_{min}$, $I_{max}$, and $I_{DS}$ being fed into the comparator unit CMR which checks to determine whether the drive current value $I_{DS}$ is greater than the upper limit $I_{max}$ or less than the lower limit $I_{min}$. If $I_{DS}$ is greater than $I_{max}$ or less than $I_{min}$, the comparator CMR issues the alarm ALM, in response to which the motion of the robot is halted.

It should be noted that the description rendered in conjunction with FIG. 2 relates to the Z-axis only. In practice, however, control is effected similarly for the other axes (R-axis, θ-axis) as well. Also, it is noted that drive power can be the measured motor parameter instead of drive current. In this case, instead of the censor CT, a power sensor is used. Furthermore, it has been described that the upper and lower limit values are stored in the memory TCM. By providing an upper and lower limit value arithmetic circuit on the output side of the memory TCM, however, the average value of the drive current can be stored in the memory TCM and thence delivered to the arithmetic unit for the computation of the limit values. In the above arrangement the memory TCM, comparator unit CMR and the like have been described as being located outside of the robot control unit RBC. However, the robot control unit RBC constituted by the microcomputer can be made to perform these functions, and the upper and lower limit values can be inserted into the instructive data.

In the foregoing arrangement the upper and lower limits are obtained by reading the motor drive current while the robot is operating in accordance with the instructive data. Described next will be an arrangement in which the value of the motor drive current is predicted in advance on the basis of the robot position and attitude and from load information such as the weight of a workpiece. This permits the upper and lower limits obtained from the predicted drive current value to be set in advance.

Figure 3:
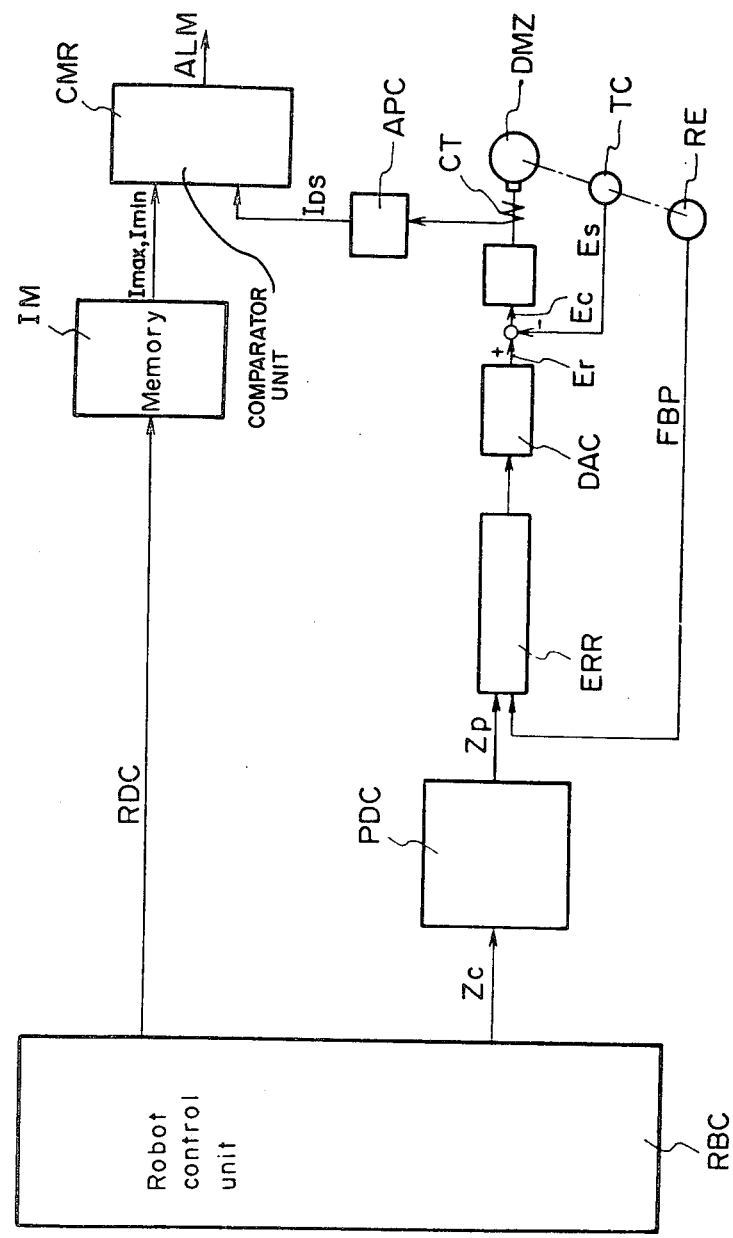

Reference will now be had to FIG. 3 to describe this second embodiment of the present invention. Unlike the first embodiment, the arrangement is such that the limit values, namely the upper limit $I_{max}$ and lower limit $I_{min}$ of the allowable current computed from the robot position and attitude and from the weight of the workpieces, are stored beforehand in a memory IM. More specifically, in the arrangement FIG. 3, the limit values are computed in advance for each of a plurality of robot positions, the computed values are stored ahead of time in the memory IM, and a drive current check instruction is imposed, in the form of a service code, on the robot instruction data (instructive data) which corresponds to each robot position. When the drive current check instruction is read, therefore, the predetermined limit values and the drive current value $I_{DS}$ sensed by the current sensor CT are applied to the comparator CMR for a comparison of magnitude, as already described in connection with FIG. 2.

Figure 4:
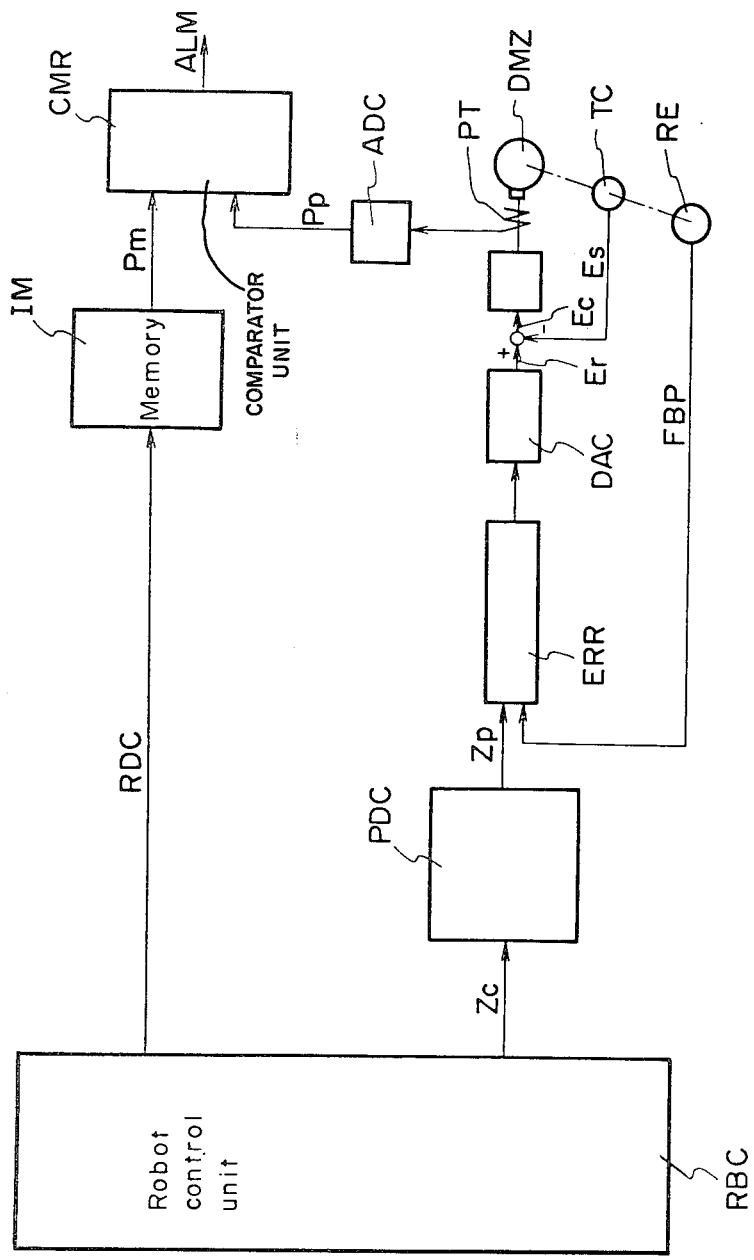

In an alternative arrangement as illustrated in FIG. 4, it is possible to deal with the motor power rather than with the motor drive current. This is a particularly effective arrangement when an AC servomotor is used as the robot drive motor, the reason being that a proportional relationship exists between load torque and driving power. The arrangement of FIG. 4 differs from that of FIG. 3 in that a power sensor PT is provided instead of the current sensor, and in that the limits of the robot power, namely the upper limit $P_{max}$ and lower limit $P_{min}$ of the power, are stored in the memory IM. $P_p$ in FIG. 4 denotes the sensed power.

The present invention as described hereinabove makes it possible to sense abnormal conditions such as excessive loads with a high degree of accuracy, and to prevent robot malfunction as well as damage to the robot and machine tools.

As many apparently widely different embodiments of the present invention can be made without departing from the spirit and scope thereof, it is to be understood that the invention is not limited to the specific embodiments thereof except as defined in the appended claims.

What we claim is:

1. A method of sensing an abnormal condition in a robot control apparatus for operating in accordance with instructive data a robot, having at least one motor, a limit value teaching mode and a playback mode of operation, said method comprising the steps of:
    (a) operating the robot in accordance with said instructive data in said limit value teaching mode;
    (b) reading the value of a motor drive current of said motor in said limit value teaching mode of operation;
    (c) setting limit values computed in accordance with said value of the drive current;
    (d) sensing the value of the motor drive current in said robot playback mode;
    (e) monitoring the sensed value to determine whether it is outside the range of the limit values; and
    (f) generating an alarm signal when the sensed value is outside the range of the limit values.

2. The method according to claim 1, wherein, in step (c) the values of the motor drive current are averaged and said limit values are computed in accordance with the average value.

3. The method according to claim 1, wherein said instructive data comprises a checking instruction for checking the motor drive current value, and
wherein the step (b), the value of the motor drive current is read in response to said checking instruction in the limit value teaching mode of operation, and in step (c) the limit values are computed then set, and in step (d) the value of the motor drive current is sensed in response to said checking instruction in the playback mode of operation, and in step (e) said value is monitored in order to determine whether it is outside the limit values.

4. A method for operating in accordance with instructive data, a robot, having at least one motor, a limit value teaching mode, a workpiece and a playback mode of operation said method comprising the steps of:
   (a) predicting a drive current value of said motor from the position and attitude of said robot, and from the weight of said workpiece;
   (b) setting limit values computed on the basis of said drive current value;
   (c) sensing the value of the motor drive current in said robot playback mode;
   (d) monitoring the sensed value to determine whether it is outside the range of the limit values; and
   (e) generating an alarm signal when the sensed value is outside the range of the limit values.

5. The method according to claim 4, wherein said instructive data comprises a checking instruction for checking the motor drive current value, and discriminating whether said motor drive current value is within the range of the limit values in response to said checking instruction.

6. A method of sensing an abnormal condition in a robot control apparatus for operating in accordance with instructive data a robot, having at least one motor, a limit value, a teaching mode and a playback mode of operation, said method comprising the steps of:
   (a) operating the robot in accordance with said instructive data in said teaching mode for teaching limit values;
   (b) reading the value of a motor drive power of said motor in said limit value teaching mode of operation;
   (c) setting limit values computed in accordance with said value of the drive power;
   (d) sensing the value of the motor drive power in said robot playback mode;
   (e) monitoring the sensed value to determine whether it is outside the range of the limit values; and
   (f) generating an alarm signal when the sensed value is outside the range of the limit values.

7. The method according to claim 6, wherein said instructive data comprises a checking instruction for checking the motor drive power value, and
wherein the step (b), the value of the motor drive power is read in response to said checking instruction in the limit value teaching mode of operation, and in step (c) the limit values are computed then set, and in step (d) the value of the motor drive power is sensed in response to said checking instruction in the playback mode of operation, and in step (e) said value is monitored in order to determine whether it is outside the limit values.

8. A method for operating in accordance with instructive data a robot, having at least one motor, a limit value teaching mode, a workpiece and a playback mode of operation, said method comprising the steps of:
   (a) predicting a drive power value of said motor from the position and attitude of said robot, and from the weight of said workpiece;
   (b) setting limit values computed on the basis of said drive power value;
   (c) sensing the value of the motor drive power in said robot playback mode;
   (d) monitoring the sensed value to determine whether it is outside the range of the limit values; and
   (e) generating an alarm signal when the sensed value is outside the range of the limit values.

9. The method according to claim 8, wherein said instructive data comprises a checking instruction for checking the motor drive power value, and discriminating whether said motor drive power value is within the range of the limit values in response to said checking instruction.

* * * * *

UNITED STATES PATENT AND TRADEMARK OFFICE
CERTIFICATE OF CORRECTION

PATENT NO. : 4,475,160

DATED : October 2, 1984

INVENTOR(S) : Inaba

It is certified that error appears in the above-identified patent and that said Letters Patent is hereby corrected as shown below:

```
Column 2, lines 35-37, delete and substitute therefor the
    the following (per Amendment of April 16, 1984):
    --Fig. 1A illustrates a plan view of an industrial
    robot to which the present invention can be applied;
      Fig. 1B illustrates a side view of an industrial
    robot to which the present invention can be applied;
    and--;
     line 46, "FIG." should be --FIGS.--;
     line 47, "1" (first occurrence) should be
    --1A and 1B--.
```

Signed and Sealed this

Thirtieth Day of April 1985

[SEAL]

Attest:

DONALD J. QUIGG

Attesting Officer     Acting Commissioner of Patents and Trademarks